United States Patent
Vu (10) Patent No.: US 10,428,969 B2
(45) Date of Patent: Oct. 1, 2019

(54) COMPACT CIRCULAR LINKAGE FOR A PUSHING ACTUATOR

(71) Applicant: VistadelTek, LLC, Yorba Linda, CA (US)

(72) Inventor: Kim Ngoc Vu, Yorba Linda, CA (US)

(73) Assignee: VistadelTek, LLC, Yorba Linda, CA (US)

( * ) Notice: Subject to any disclaimer, the term of this patent is extended or adjusted under 35 U.S.C. 154(b) by 0 days.

(21) Appl. No.: 16/418,389

(22) Filed: May 21, 2019

(65) Prior Publication Data

US 2019/0271404 A1 Sep. 5, 2019

Related U.S. Application Data

(63) Continuation of application No. 16/196,673, filed on Nov. 20, 2018, now Pat. No. 10,323,766.

(60) Provisional application No. 62/589,062, filed on Nov. 21, 2017.

(51) Int. Cl.
| | |
|---|---|
| *F16K 31/00* | (2006.01) |
| *F16J 15/06* | (2006.01) |
| *F16J 15/08* | (2006.01) |
| *F16K 27/02* | (2006.01) |
| *F16K 7/12* | (2006.01) |
| *F16K 7/14* | (2006.01) |
| *H02N 2/04* | (2006.01) |

(52) U.S. Cl.
CPC ........... *F16K 31/007* (2013.01); *F16J 15/062* (2013.01); *F16J 15/0881* (2013.01); *F16K 7/12* (2013.01); *F16K 7/14* (2013.01); *F16K 27/0236* (2013.01); *H02N 2/043* (2013.01)

(58) Field of Classification Search
CPC ...... F16K 31/007; F16K 27/0236; F16K 7/12; F16K 7/14; F16K 31/0655–0665; F16K 31/0672; F16K 31/12–163; F16K 31/165; F16K 31/004–005; H02N 2/043; F16J 15/062; F16J 15/0881
See application file for complete search history.

(56) References Cited

U.S. PATENT DOCUMENTS

| | | | |
|---|---|---|---|
| 4,768,750 A * | 9/1988 | Wilson | F16B 3/00 251/308 |
| 5,145,147 A | 9/1992 | Nakazawa et al. | |
| 8,181,932 B2 | 5/2012 | Matsumoto et al. | |
| 9,109,732 B2 | 8/2015 | Vu | |
| 9,163,743 B2 | 10/2015 | Hidaka et al. | |

(Continued)

FOREIGN PATENT DOCUMENTS

| | | | |
|---|---|---|---|
| JP | 4119109 B2 | 7/2008 | |
| WO | WO-2014156043 A1 * | 10/2014 | F16K 7/14 |

(Continued)

OTHER PUBLICATIONS

International Search Report and the Written Opinion of the International Searching Authority from corresponding PCT/US2018/062068 dated Mar. 12, 2019.

*Primary Examiner* — Marina A Tietjen
(74) *Attorney, Agent, or Firm* — Lando & Anastasi, LLP (57) ABSTRACT

A compact unitized mechanical linkage, which can be handled as a single piece within a valve top works, transmits force and motion of a piezoelectric actuator stack to a moveable element in a control valve. The linkage has few parts and all may be made at low cost.

21 Claims, 9 Drawing Sheets

(56) References Cited

U.S. PATENT DOCUMENTS

| | | |
|---|---|---|
| 9,625,047 B2 | 4/2017 | Hirose et al. |
| 10,113,665 B2 | 10/2018 | Vu |
| 2010/0127196 A1 | 5/2010 | Sawada et al. |
| 2015/0059877 A1 | 3/2015 | Vu |
| 2016/0047483 A1* | 2/2016 | Hirose ............... F16K 7/14 137/602 |
| 2016/0363231 A1* | 12/2016 | Yasumoto ............ F16K 7/14 |
| 2018/0240961 A1* | 8/2018 | Shigyou ............ F16K 31/02 |

FOREIGN PATENT DOCUMENTS

| | | | | |
|---|---|---|---|---|
| WO | WO-2015125438 A1 | * | 8/2015 | ............ F16K 7/14 |
| WO | WO-2017033423 A1 | * | 3/2017 | ......... H01L 41/053 |

* cited by examiner

SECTION I-I

FIG. 2B

SECTION II-II

SECTION III-III

FIG. 3B

SECTION IV-IV

COMPACT CIRCULAR LINKAGE FOR A PUSHING ACTUATOR

CROSS-REFERENCE TO RELATED APPLICATIONS

This application is a continuation of U.S. patent application Ser. No. 16/196,673 filed Nov. 20, 2018, which claims the benefit under 35 U.S.C. § 119(e) to U.S. Provisional Application Ser. No. 62/589,062 filed Nov. 21, 2017, both of which are incorporated by reference herein in their entireties for all purposes. This application is related to U.S. patent application Ser. No. 15/182,978, titled "LOW HYSTERESIS DIAPHRAGM FOR A VALVE," filed Jun. 15, 2016 and U.S. Pat. No. 9,109,732B2, titled "EZ-SEAL GASKET FOR JOINING FLUID PATHWAYS," issued Aug. 18, 2015.

BACKGROUND

Embodiments of the present invention are related to a linkage for use with an actuator that extends when activated. The linkage is compact and circular in shape which makes it especially useful with bellows and piezoelectric actuators. Embodiments of the invention are particularly useful in valves intended for proportional, or modulating, control of fluid delivery within industrial processes making semiconductor devices, pharmaceuticals, or fine chemicals, and similar fluid delivery systems.

Using piezoelectric actuators in normally closed proportional valves for high purity fluid delivery in semiconductor capital equipment is known. Typical designs transmit actuator motion to the movable elements inside such valves through relatively complicated mechanisms comprised of many separate pieces which often are costly to make. Mechanical assemblies having more than a dozen individual parts are common and often involve cross drilling through cylindrical elements, several separate springs and pins, truncated or polygonal shapes, and so forth. For example, U.S. Pat. No. 8,181,932B2 issued to Matsumoto, et al., includes a disc-shaped first preload jig having two parallel chordal through-holes capturing coupling pins which project through corresponding radial holes in a tubular actuator box and a concentric second preload jig. Another example, Japanese Patent No. 4119109 (discussed as prior art within U.S. Pat. No. 9,163,743 issued to Hidaka, et al.) includes a support cylinder made from Invar material having diametrically opposite arch-shaped radial openings which accommodate inserted hat-shaped semicircular split base pieces. Another example, U.S. Pat. No. 9,625,047B2 issued to Hirose, et al, includes a lower support cylinder within which a support frame is horizontally disposed through notches (in the support cylinder walls) and threaded items are secured with locking screws having hexagonal internal openings (typically made by broaching processes).

SUMMARY

In consideration of the foregoing applicant has invented a compact circular linkage, for use with an expanding (pushing) actuator in a normally closed valve, which has a reduced number of easily made parts and can be handled as a single simple subassembly. An embodiment of a mechanical linkage between an expanding actuator and a moveable element of a valve comprises a thrust plate contacting a stationary portion of the valve, and a moveable hidden fork having two or more prongs penetrating axial thru-slots in the thrust plate, wherein the two or more prongs are permanently attached to a lifting nut mechanically connected to the moveable element. The expanding actuator may be a piezoelectric stack. The valve may be a proportional modulating valve. In some embodiments the hidden fork prongs are permanently attached by welding. In some embodiments the thrust plate, hidden fork, and lifting nut are axisymmetric and of a circular shape. In some embodiments the thrust plate has a circumferential region with a radius to cause automatic centering of the thrust plate when captured by a mating conical shape.

In one aspect of the present disclosure, a linkage assembly is provided to operatively couple an expanding valve actuator and a movable element of a valve housing of a valve. In some embodiments, the linkage assembly comprises a thrust plate, a lifting housing to engage the expanding valve actuator, a ring nut, and a lifting element. The thrust plate has a thrust plate body and includes a plurality of thru-slots defined in the thrust plate body and that extend axially through the thrust plate body. The lifting housing includes a plurality of prongs depending from the lifting housing and extending through at least one of the plurality of thru-slots. The ring nut is secured to the valve housing and surrounds the plurality of prongs. The ring nut secures the thrust plate to the valve housing. The lifting element is secured to the plurality of prongs and is securable to the movable element.

In some embodiments, the linkage assembly further comprises a guide disc attached to the thrust plate body and attached to the lifting housing to center an upper end of the thrust plate body within the lifting housing and to provide angular indexing between the plurality of prongs and the plurality of thru-slots.

In some embodiments, the guide disc is attached to the thrust plate body by one of a weld, at least one threaded fastener, and at least one rivet, and the guide disc is attached to the lifting housing by at least one of a weld, at least one threaded fastener, and at least one rivet.

In some embodiments, the guide disc is attached to the thrust plate body by at least one first rivet received in at least one first blind hole defined in the thrust plate body, and wherein the guide disc is attached to the lifting housing by at least one second rivet received in at least one second blind hole defined in the lifting housing.

In some embodiments, the lifting housing is cylindrical, and the plurality of prongs includes two arcuate prongs that are symmetrically arranged on a lower end of the lifting housing, the two arcuate prongs being circumferentially spaced apart by two reliefs defined circumferentially between the two arcuate prongs.

In some embodiments, the plurality of thru-slots includes two arcuate thru-slots that are symmetrically arranged on the thrust plate body, the arcuate thru-slots being separated by radial bridges of the thrust plate body.

In some embodiments, the thrust plate includes a reduced diameter upper body portion connected to a full diameter lower body portion, the upper body portion being connected to the lower body portion by the radial bridges.

In some embodiments, the thrust plate body includes a button centered on the upper body portion of the thrust plate body, the button being configured to contact the expanding valve actuator.

In some embodiments, the ring nut is externally threaded to engage a mating female threaded counterbore of a valve housing to secure the thrust plate body to the valve housing.

In some embodiments, a conical surface of the ring nut mates with a circumferential region of the thrust plate, the circumferential region having a shoulder radius to center the thrust plate within the valve housing when the conical surface of the ring nut is tightened against the circumferential region of the thrust plate.

In some embodiments, the movable element is a control shaft of a normally closed diaphragm valve, the control shaft being secured to a control plate body that is configured to sealingly engage an orifice ridge of the normally closed diaphragm valve, and wherein the lifting element includes an internally threaded hole that screws onto the control shaft.

In some embodiments, the linkage assembly further comprises a guide disc attached to the thrust plate body and attached to the lifting housing to center an upper end of the thrust plate body within the lifting housing and to provide angular indexing between the plurality of prongs and the plurality of thru-slots, the guide disc being attached to the thrust plate body by at least one first rivet received in at least one first blind hole defined in the thrust plate body being attached to the lifting housing by at least one second rivet received in at least one second blind hole defined in the lifting housing.

In some embodiments, the lifting element has a circular shape and has a circumferential step, each prong including a step relief at a lower end of the prong secured to the circumferential step of the lifting element.

In some embodiments, each of the lifting element, the thrust plate, the ring nut, the lifting housing, and the guide disc are made from a metal material or a polymer material.

In some embodiments, the movable element is a control shaft of a normally closed diaphragm valve, the control shaft being secured to a control plate body that is configured to sealingly engage an orifice ridge of the normally closed diaphragm valve, and wherein the lifting element includes an internally threaded hole that screws onto the control shaft.

In some embodiments, the plurality of thru-slots includes at least two arcuate thru-slots symmetrically arranged on the thrust plate body, the arcuate thru-slots being separated by radial bridges of the thrust plate body.

In some embodiments, the ring nut is externally threaded to engage a mating female threaded counterbore of a valve housing to secure the thrust plate body to the valve housing.

In some embodiments, the lifting element has a circular shape and has a circumferential step, each prong including a step relief at a lower end of the prong secured to the circumferential step of the lifting element.

In some embodiments, the expanding valve actuator is one of a piezoelectric stack, a bellows, and a pneumatic piston.

In some embodiments, the valve is a proportional modulating valve.

In some embodiments, the valve is a normally closed valve.

In some embodiments, the plurality of prongs are permanently attached to the lifting element.

In some embodiments, the plurality of prongs are permanently attached to the lifting element by welding.

In some embodiments, the thrust plate, the plurality of prongs, and the lifting element are axisymmetric and of a circular shape.

In some embodiments, a conical surface of the ring nut mates with a circumferential region of the thrust plate, the circumferential region having a shoulder radius, to center the thrust plate within the valve housing.

In some embodiments, a linkage assembly according to any of the above embodiments is provided in combination with the valve housing, the valve housing including a counterbore to receive the linkage assembly. In some embodiments, the linkage assembly further comprises a low hysteresis diaphragm formed within the valve housing. In some embodiments, the linkage assembly further comprises a control shaft secured to the low hysteresis diaphragm and a control plate body secured to a lower end of the control shaft. In some embodiments, the linkage assembly includes a boost spring seated in the counterbore beneath the linkage assembly, the boost spring providing one of actuator preload or extra shut-off force.

In another aspect of the present disclosure, a linkage is provided between an expanding valve actuator and a movable element of a valve housing of a valve. The linkage comprises a fixed portion configured to attach to the valve housing and a movable portion configured for axial movement relative to the fixed portion. The fixed portion includes a thrust plate including a plurality of thru-slots; and a ring nut securing the thrust plate to the valve housing. The movable portion includes a lifting housing engaging the expanding valve actuator, and a lifting element. The lifting housing includes a plurality of prongs. The plurality of prongs are surrounded by the ring nut. Each one of the plurality of prongs extends through a respective one of the plurality of thru-slots. The lifting element is secured to the plurality of prongs of the lifting housing, and the lifting element is securable to the movable element.

In some embodiments, the valve is a normally closed valve, and the expanding valve actuator is one of a piezoelectric stack, a bellows, and a pneumatic piston.

In some embodiments, the valve is a normally closed valve.

In some embodiments, the plurality of prongs are permanently attached to the lifting element.

In some embodiments, the plurality of prongs are permanently attached to the lifting element by welding.

In some embodiments, a conical surface of the ring nut mates with a circumferential region of the thrust plate, the circumferential region having a shoulder radius.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The use of directional adjectives "inner," "outer," "upper," "lower," and like terms, are meant to assist with understanding relative relationships among design elements and should not be construed as meaning an absolute direction in space nor regarded as limiting.

Figure 1:
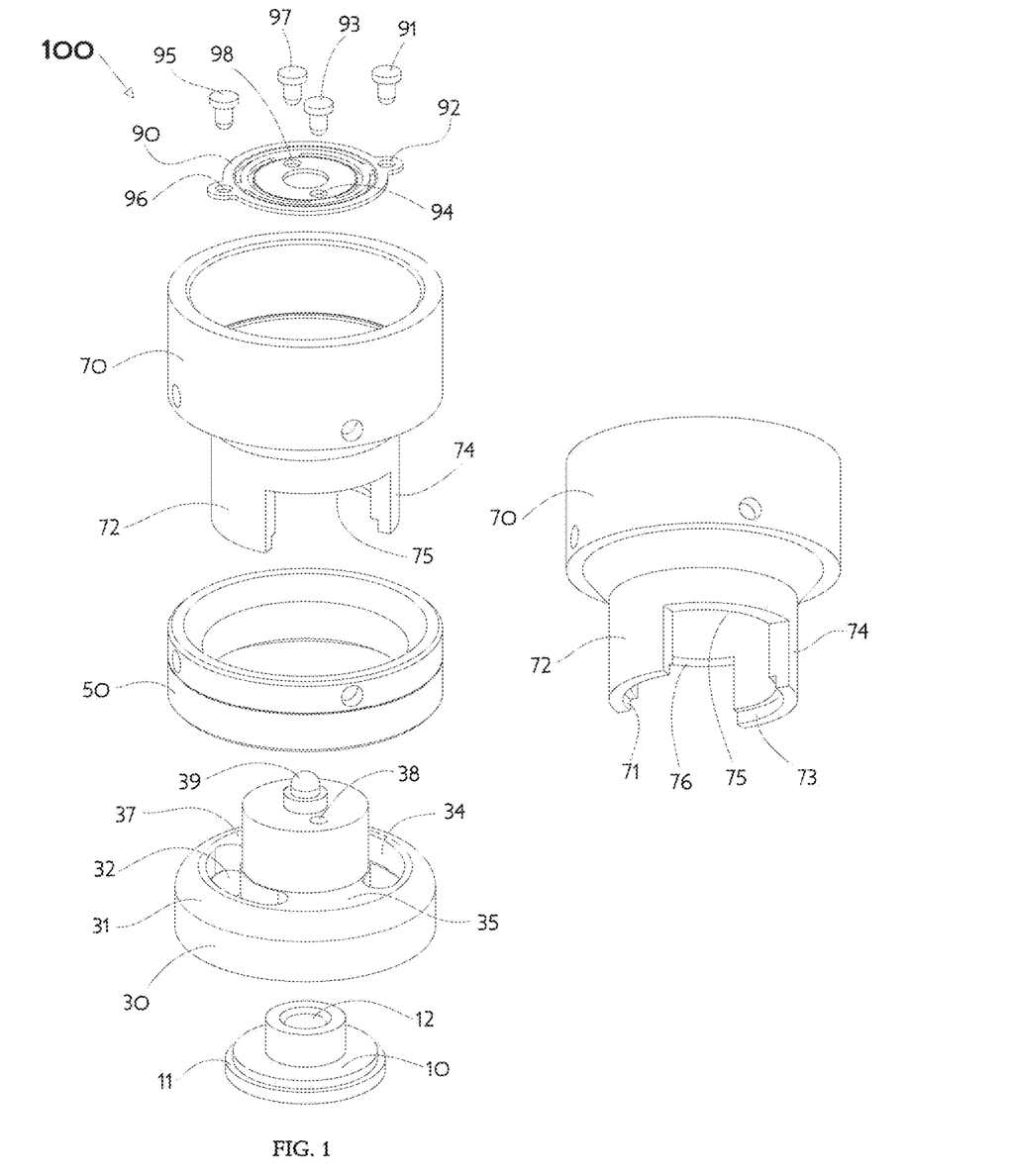
FIG. 1 is an exploded view of an embodiment of a circular linkage in accordance with aspects of the present invention.
Figure 2A:
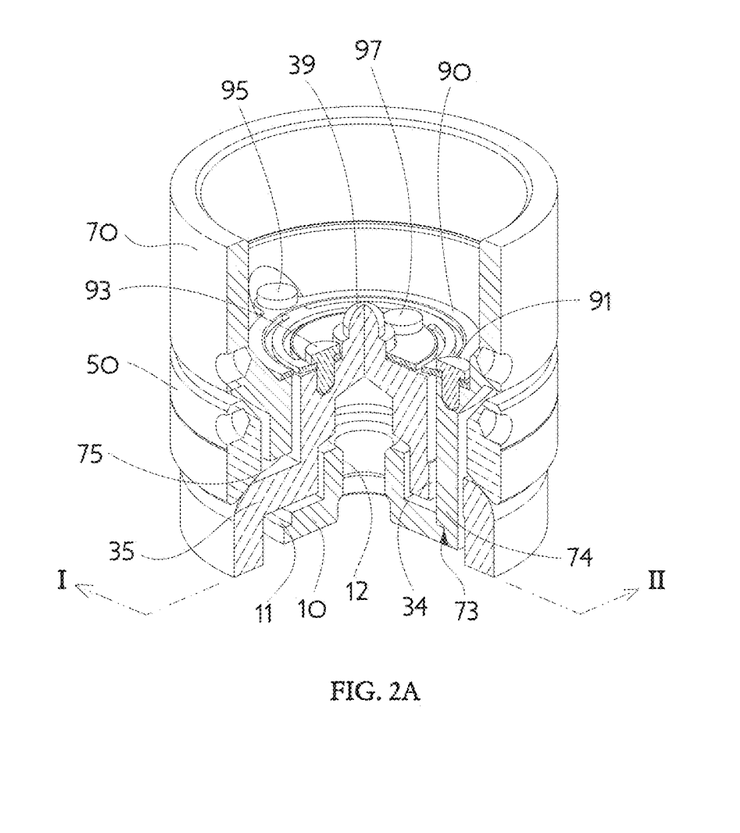
FIG. 2A is a perspective of the circular linkage of FIG. 1 with a quarter segment removed to reveal the relationship of assembled parts.
Figure 2B:
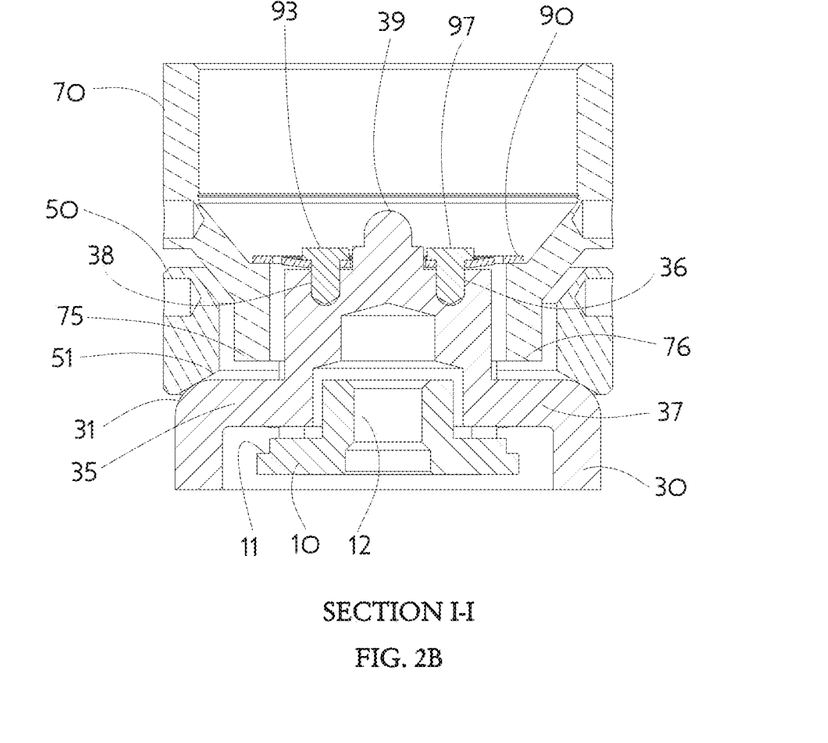
FIG. 2B is a cross-sectional view of the circular linkage of FIG. 1 taken along plane I-I as indicated in FIG. 2A showing a lifting element positioned below a thrust plate.
Figure 2C:
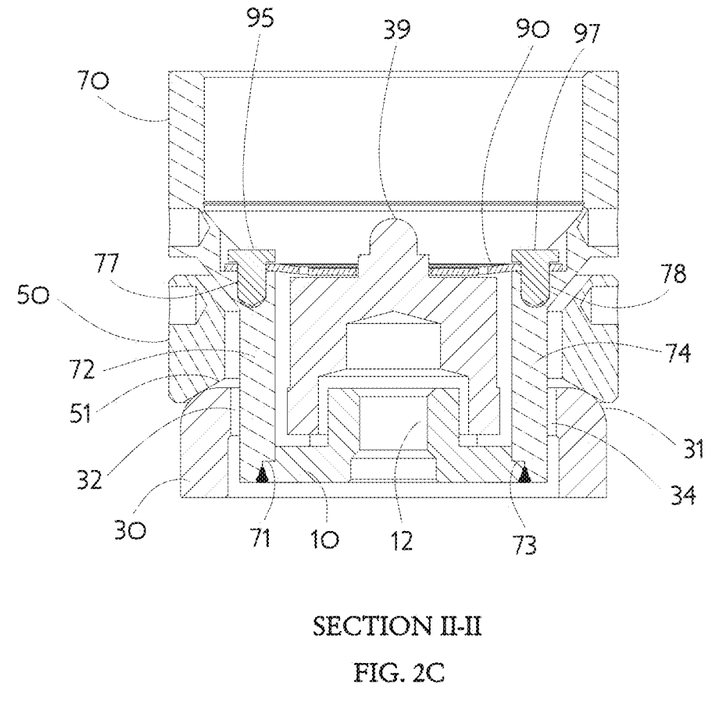
FIG. 2C is a cross-sectional view of the circular linkage of FIG. 1 taken along plane II-II as indicated in FIG. 2A showing weld attachment of a lifting element to lifting housing hidden fork prongs.
Figure 3A:
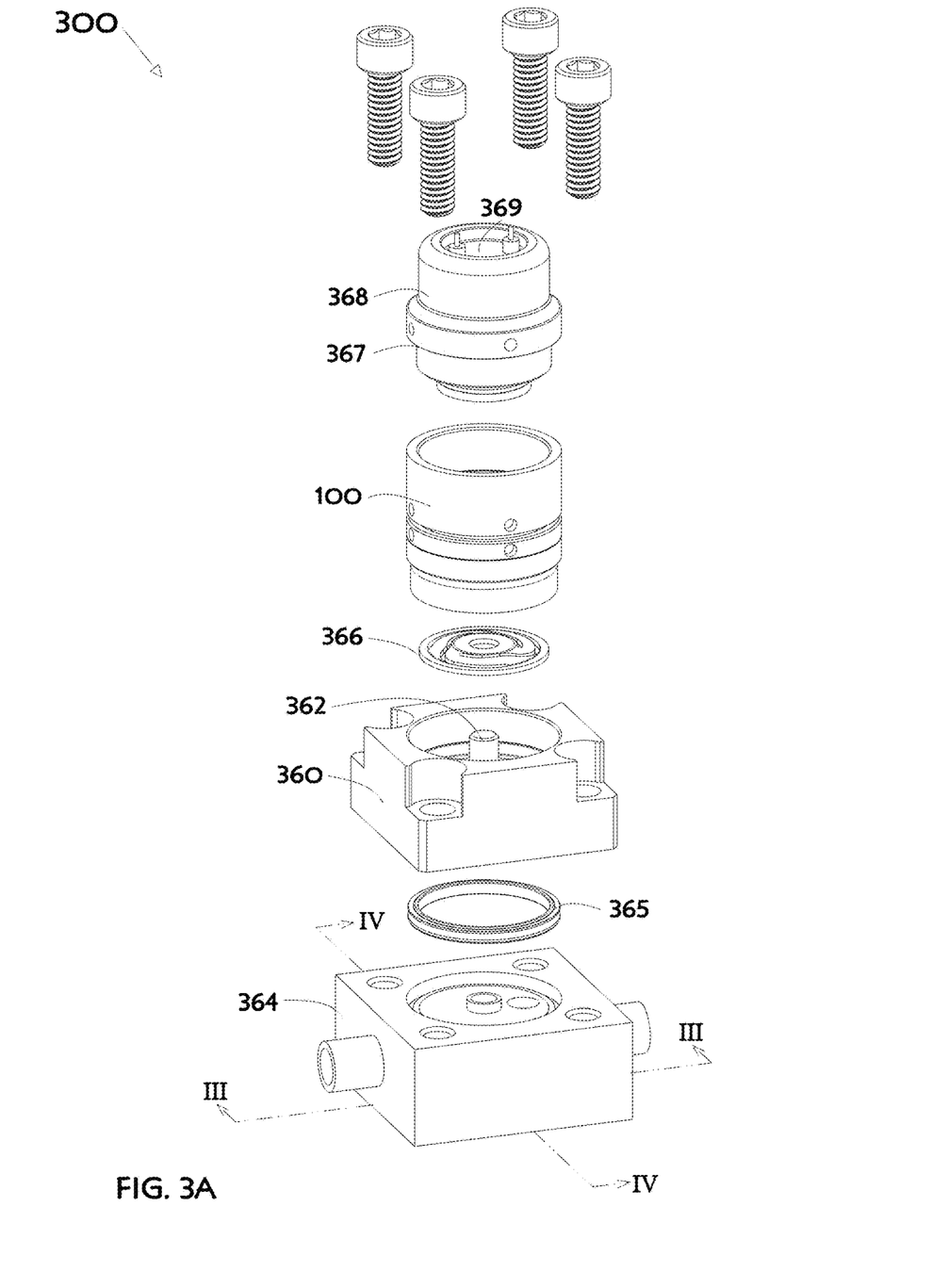
FIG. 3A is an exploded of a representative valve using the circular linkage of FIG. 1 with a piezoelectric actuator.

The small number of pieces needed to make a representative example of an embodiment of the compact circular linkage 100 for a pushing actuator is shown by the perspective exploded view illustrated in FIG. 1. There are five major pieces: a lifting element 10, a thrust plate 30, a ring nut 50, a lifting housing 70, and a guide disc 90. These pieces fit together making the compact circular linkage 100 a subassembly suited to easy use in the top works of an exemplary valve 300 as illustrated in FIG. 3A. The relationship of the circular linkage subassembly pieces will be further explained with reference to the cross-sectional views illustrated in FIG. 2A-2C.

Figure 3B:
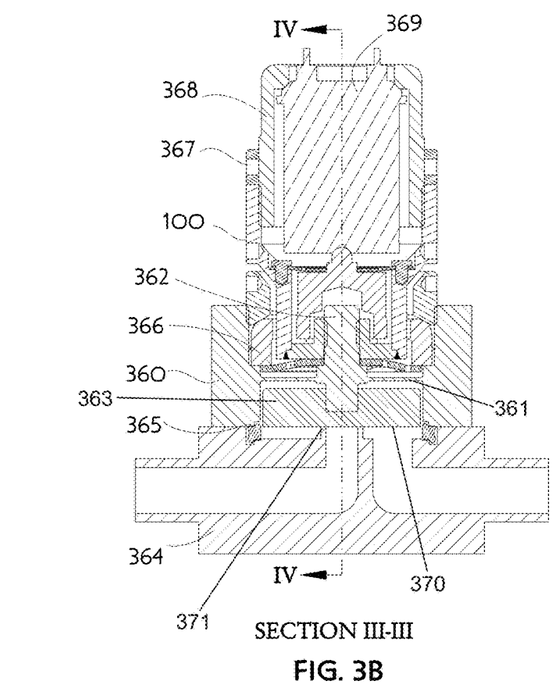
FIG. 3B is a cross-sectional view of the representative valve of FIG. 3A taken along plane III-III as indicated in FIG. 3A.
Figure 3C:
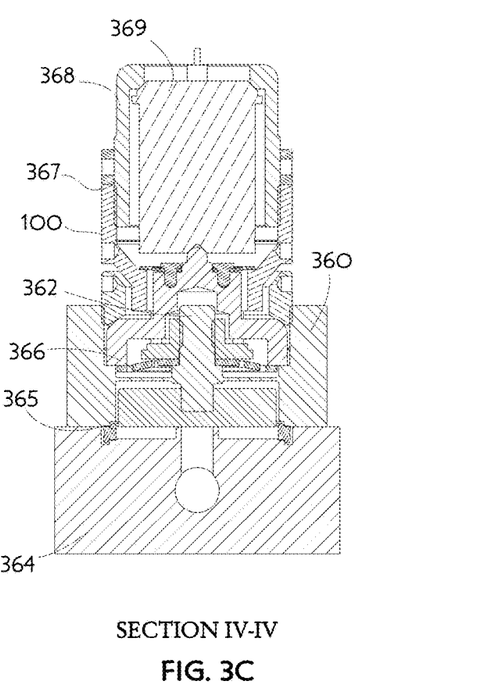
FIG. 3C is a cross-sectional view of the representative valve of FIG. 3A taken along the plane IV-IV as indicated in FIG. 3A.

A representative use of the circular linkage 100 in a valve top works can be appreciated by considering an exemplary valve 300 using the present inventor's U.S. patent application Ser. No. 15/182,978, titled "LOW HYSTERESIS DIAPHRAGM FOR A VALVE," filed Jun. 15, 2016, now U.S. Pat. No. 10,113,665, as illustrated in FIG. 3A, FIG. 3B, and FIG. 3C herein. The low hysteresis diaphragm is formed within a valve housing 360 to which a top works is assembled. The valve housing 360 may be sealing joined to a valve body 364 by using a metallic seal 365. In the present illustrations FIG. 3A, FIG. 3B, and FIG. 3C, the metallic seal 365 is made according to the present inventor's U.S. Pat. No. 9,109,732B2, titled "EZ-SEAL GASKET FOR JOINING FLUID PATHWAYS," issued Aug. 18, 2015. Additional parts of the complete valve 300 include a piezoelectric actuator stack 369 contained within an actuator housing 368, having an associated locking nut 367, which mates to the circular linkage 100 as further shown in FIG. 3B and FIG. 3C. An optional boost spring 366 may be included to provide actuator preload or extra shut-off force.

The bottom central element of the compact circular linkage 100 is the lifting element 10 which makes connection with a moveable element in the exemplary valve 300. As used in the illustrated exemplary valve 300, the lifting element 10 has an internally threaded hole 12 and screws onto a control shaft 362 within the typical low hysteresis diaphragm valve housing 360. The outer periphery of the lifting element 10 has an optional recess 11 which provides alignment and serves as a weld preparation feature when the lifting element 10 is joined to a lower portion of the lifting housing 70 as further described in this disclosure. A lifting element 10 may be easily made as a circular shape manufactured by a screw machine, or lathe for example, and the optional recess 11 then formed as a simple circumferential step.

The next element of the compact circular linkage 100 immediately above the lifting element 10 is the thrust plate 30 which has a lower portion of full diameter larger than the lifting element 10, and an upper portion of reduced diameter smaller than the lifting element 10. The radially outermost region 31 of the transition from full diameter to reduced diameter is provided with a shoulder radius to be contacted by the ring nut 50. Inward of the radiused region 31 are four sectors comprising a first radial bridge 35, an arcuate first axial thru-slot 32, a second radial bridge 37, and an arcuate second axial thru-slot 34. The reduced diameter upper portion is connected to the full diameter lower portion by the two radial bridges 35,37. An actuator contact 39, typically a hemispherical button shape, surmounts the reduced diameter upper portion and is centered on the axis of the thrust plate 30. A pair of axial blind holes 36,38 are located diametrically opposite the actuator contact 39. The circular shaped thrust plate 30 may also be easily manufactured by a screw machine or lathe.

The next element of the compact circular linkage 100, immediately above the lower portion of the thrust plate 30, is the ring nut 50. The ring nut 50 is a full diameter ring of relatively short axial length, and intermediate internal diameter, having an external thread which engages a mating female threaded counterbore of the valve housing 360 used in the exemplary valve 300. The lower inner diameter of the ring nut 50 may preferably include a conical chamfer 51 for contacting the radiused region 31 of the full diameter portion of the thrust plate 30. Careful consideration of the mating between the valve housing 360 and the circular linkage 100, as illustrated in FIG. 3B and FIG. 3C, further reveals how the conical chamfer 51 pushing against the thrust plate radius region 31 effects a natural centering of the thrust plate 30 within the valve housing 360. This centering action minimizes undesired bending forces which might otherwise be impressed upon the exemplary control shaft 362. The ring nut 50 is, of course, a part typically manufactured by a screw machine or lathe.

The next element of the compact circular linkage 100, above the ring nut 50, is the full diameter upper portion of the lifting housing 70. The lifting housing 70 has a central bore through which the upper reduced diameter portion of the thrust plate 30 may project enabling the actuator contact 39 to engage a piezo stack 369 as further described. The lifting housing 70 additionally has an intermediate diameter lower portion which projects downward through the ring nut 50 and engages the arcuate axial thru-slots 32,34 in the full diameter portion of the thrust plate 30. The intermediate diameter portion of the lifting housing 70 appears as a circular shell which has two diametrically opposed portions removed to form reliefs 75,76 that leave two prongs 72,74 of a hidden fork depending from the lifting housing 70 and projecting through the arcuate thru-slots 32,34. The reliefs 75,76 straddle the radial bridges 35,37 which are circumferentially adjacent the arcuate thru-slots 32,34. The bottom ends of the hidden fork prongs 72,74 have step reliefs 71,73 designed to engage the weld preparation feature recess 11 of the lifting element 10. The four elements (lifting element 10, thrust plate 30, ring nut 50, lifting housing 70) may be captured together as a single subassembly by stacking those elements in sequence and then attaching the bottom ends 71,73 of the hidden fork prongs 72,74 to the lifting element recess 11. The lifting housing 70 and lifting element 10 should be joined together by a process which makes the two elements behave as a single piece so pushing and pulling action of the lifting housing 70 is communicated directly to the lifting element 10 without mechanical lash nor hysteresis. Laser welding, precision TIG welding, or electron beam welding are typical suitable processes. Brazing, adhesive bonding, radial locking pins, threaded fasteners, and other designs may also be feasible in some situations. An interference fit, snap action mating shapes, adhesive, or other design methods may be considered for connecting the lifting element 10 to the exemplary control shaft 362, since pushing on the lifting housing 70 will directly move the lifting element 10, but the internally threaded hole 12 is easiest to implement. As is the case with other previously described elements of the compact circular linkage 100, the lifting housing 70 may be easily manufactured by a screw machine or a lathe.

The fifth and topmost element of the compact circular linkage 100 is the guide disc 90 which has two primary functions. The guide disc 90 provides axial alignment of the reduced diameter upper portion of the thrust plate 30 by centering it within the central bore of the lifting housing 70. The guide disc 90 also provides angular indexing between the lifting housing 70 and the thrust plate 30 to position the two prongs 72,74 of the hidden fork projecting through the arcuate thru-slots 32,34 so there is no rubbing nor other axial motion interference. The guide disc 90 is a part easily flexible in a general axial direction but relatively stiff in radial and circumferential angular location. The guide disc 90 may be conveniently attached to the lifting housing 70 and thrust plate 30 by interference fit rivets 91,93,95,97 pushed into suitable corresponding outer blind holes 77,78 of the lifting housing and inner blind holes 36,38 of the thrust plate. Other assembly methods such as welding or threaded fasteners may be considered, but the rivets 91,93, 95,97 benefit from relative ease of assembly when located above lifting housing features (e.g. hidden fork prongs 72,74) that resist the force of rivet insertion. The guide disc 90 may be made by chemical etching of sheet metal stock, but it should also be appreciated all five elements 10,30,50, 70,90 may also be manufactured of either metal or polymer materials by processes such as injection molding, die-casting, or additive manufacturing methods such as 3D printing. In various embodiments, one or more of the elements 10, 30, 50, 70, 90 may be formed from a corrosion resistant metallic alloy, such as type 316 stainless steel, a nickel-based superalloy, a cobalt-based superalloy, a nickel-chromium alloy, or a cobalt-chromium alloy, although other suitable materials may be used, depending on the type of fluid. In some embodiments, one or more of the elements 10, 30, 50, 70, 90 may be formed from an alloy selected from Hastelloy® brand nickel-chromium alloys available from Haynes International, or formed from an alloy selected from Elgiloy® brand cobalt-chromium alloys available from Elgiloy Specialty Metals. In some embodiments, one or more of the elements 10, 30, 50, 70, 90 may be formed from a polymer material, such as a thermoplastic.

As illustrated in FIG. 3A, FIG. 3B, and FIG. 3C, the exemplary valve 300 comprises a valve body 364 to which a valve housing 360 is sealing attached by threaded fasteners that compress an EZ-Seal gasket 365. The compact circular linkage 100 sits in a counterbore in the valve housing 360. A typical assembly sequence would be to fit an optional boost spring 366 into the counterbore followed by the circular linkage 100. Then rotate the lifting housing 70, of the circular linkage 100, to thread the attached lifting element 10 onto the correspondingly threaded control shaft 362 until the thrust plate 30 rests against the counterbore bottom. The ring nut 50 may then be separately screwed into a mating thread of the valve housing 360 counterbore so the conical chamfer 51 pushes against the radiused region 31 of the thrust plate 30 thereby centering and locking it inside the counterbore along with the boost spring 366. Adjustment shims and similar loose pieces are not needed. A typical actuator housing 368 will screw into the full diameter portion of the lifting housing 70 causing a piezoelectric actuator stack 369 to rest against the centered actuator contact 39 of the thrust plate 30. The actuator housing may be locked into place by a locking nut 367 as illustrated.

Operation of the exemplary valve 300 using the compact circular linkage 100 is straightforward. An activation voltage applied to the piezoelectric actuator stack 369 will cause the stack to expand in length (extend). The lower end of the actuator stack 369 rests against the actuator contact 39, itself being part of the thrust plate 30 which is in solid contact with the valve housing 360, and therefore the lower end of the actuator stack 369 cannot move relative to the valve housing 360. The upper end of the actuator stack 369 is in contact with the actuator housing 368 which must respond to the actuator stack expansion by rising upward together. The actuator housing 368 being threaded into the full diameter portion of the lifting housing 70 makes the entire lifting housing 70 also rise upward, including the hidden fork prongs 72,74 connected to the lifting element 10. In this manner the lifting element 10 must rise and thereby lift the control shaft 362 which causes the moveable control element to allow fluid flow through the valve body 364.

The valve housing 360 includes a valve diaphragm 361 that may be integrally formed with the valve housing 360. In some embodiments, the valve diaphragm 361 is a low hysteresis valve diaphragm. In some embodiments, the movable element is a control shaft 362 that is affixed to the diaphragm. The moveable element may be comprised of a control plate affixed to the control shaft that is affixed to the diaphragm. The lifting element 10 includes an internally threaded hole that screws onto the control shaft. FIGS. 3B and 3C show a normally closed valve in which a control plate 363 is secured to a lower end of the control shaft 362. The control plate 363 has a control plate body that has a lower surface 370 that sealingly engages an orifice ridge 371 of the normally closed diaphragm valve. Due to the operation of the linkage 100 described herein, expansion of the expandable actuator 369 causes upward movement of the actuator housing 368 relative to the valve housing 360, resulting in upward movement of the lower surface 370 of the control plate 363 with respect to the orifice ridge 371.

Figure 4:
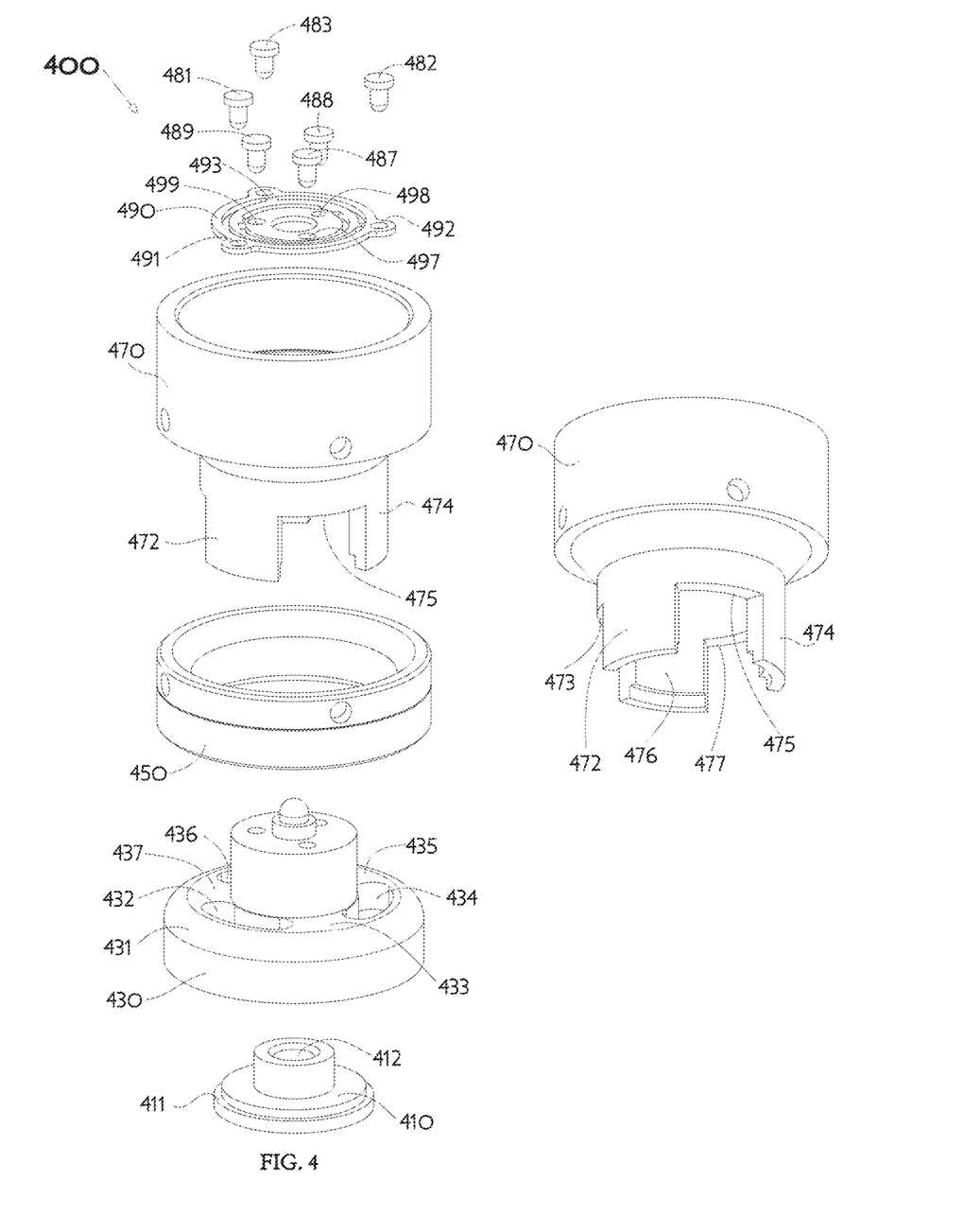
FIG. 4 is an exploded view of another embodiment of the circular linkage.

Other shape combinations of hidden fork prongs and arcuate axial thru-slots may be considered by skilled designers. Another combination is illustrated in FIG. 4 showing an exploded view of a compact circular linkage 400 having a hidden fork structure comprising three symmetrically placed axial members 472,474,476 which pass through three corresponding axial thru-slots 432,434,436 in the full diameter portion of a thrust plate 430. Corresponding reliefs 473,475, 477 between the hidden fork prongs 472,474,476 which straddle the radial bridges 433,435,437 between the thru-slots 432,434,436 are shown along with similar features like numbered as in FIG. 1. One notable difference between the circular linkage 100 of FIG. 1 and the circular linkage 400 of FIG. 4 is the changes in securing the guide disc 490. With the three-way symmetry of the circular linkage 400 in FIG. 4 a designer may choose three-way symmetry for the guide disc 490. Such an arrangement uses three inner rivets 487,488,489 which connect to the thrust plate 430 and three outer rivets 481,482,483 that connect to the lifting housing 470. This design choice benefits from the axial strength of hidden fork prongs 472,474,476 to resist the insertion force when placing the outer rivets 481,482,483 securing the guide disc 490 via its outer holes 491,492,493.

Figure 5:
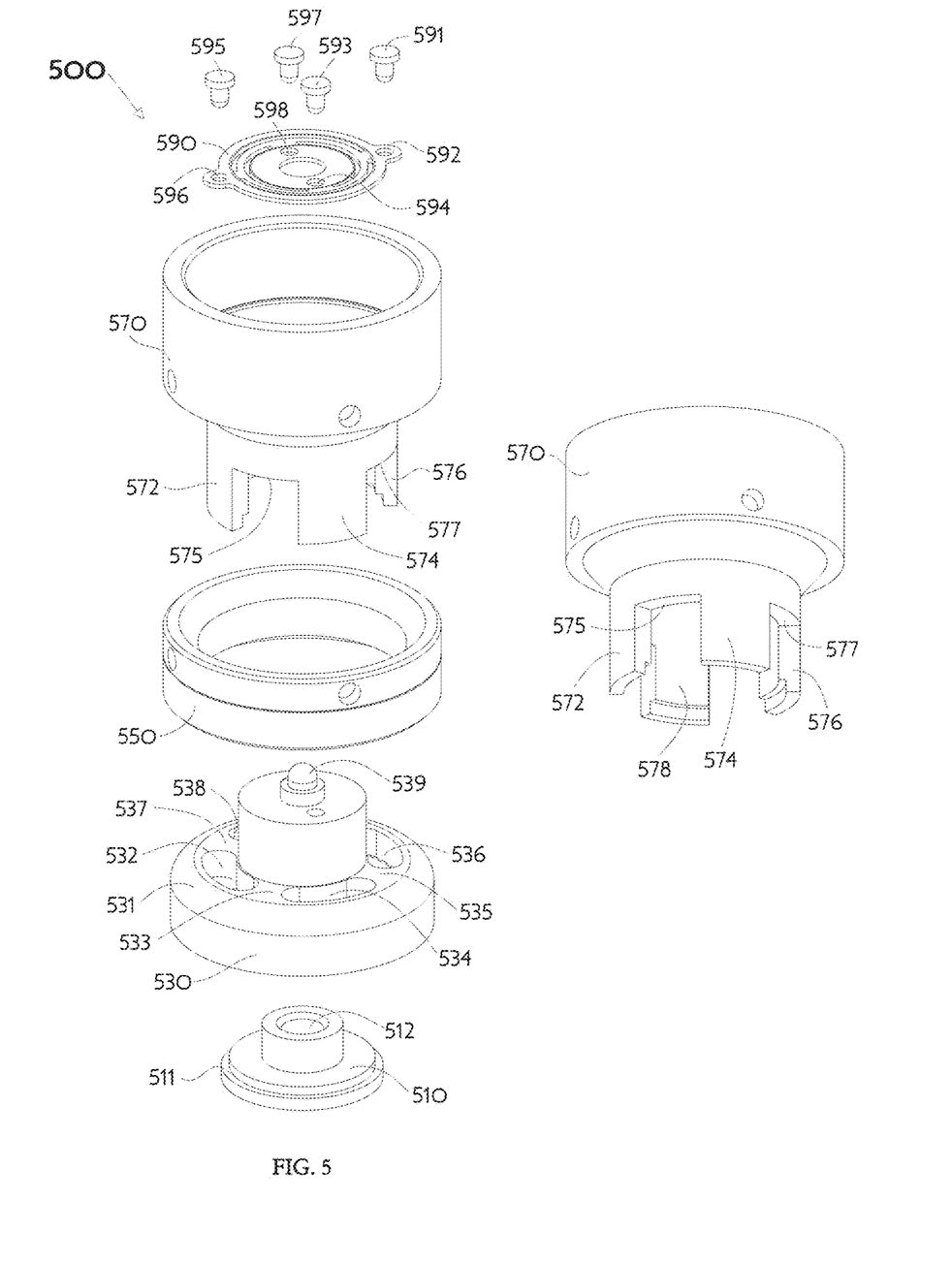
FIG. 5 is an exploded view of another embodiment of the circular linkage.

Yet another combination is illustrated in FIG. 5 showing an exploded view of a compact circular linkage 500 having a hidden fork structure comprising four symmetrically placed axial members 572,574,576,578. Corresponding axial thru-slots 532,534,536,538 in the full diameter portion of a thrust plate 530, reliefs 575,577, etc. between hidden fork prongs 572,574,576,578, and straddled radial bridges 533,535,537, etc. between the thru-slots 532,534,536,538, are shown with similar features like numbered as in FIG. 1. This circular linkage 500 being bilaterally symmetric only needs four rivets 591,593,595,597 securing the guide disc 590 as in the original case 100 illustrated in FIG. 1. A designer might also choose to use round rods in an intermediate diameter array projecting from a lifting housing passing through round holes, instead of arcuate thru-slots, in a mating thrust plate but such an arrangement is likely more expensive to make than the screw machine oriented parts described in this disclosure.

Figure 6:
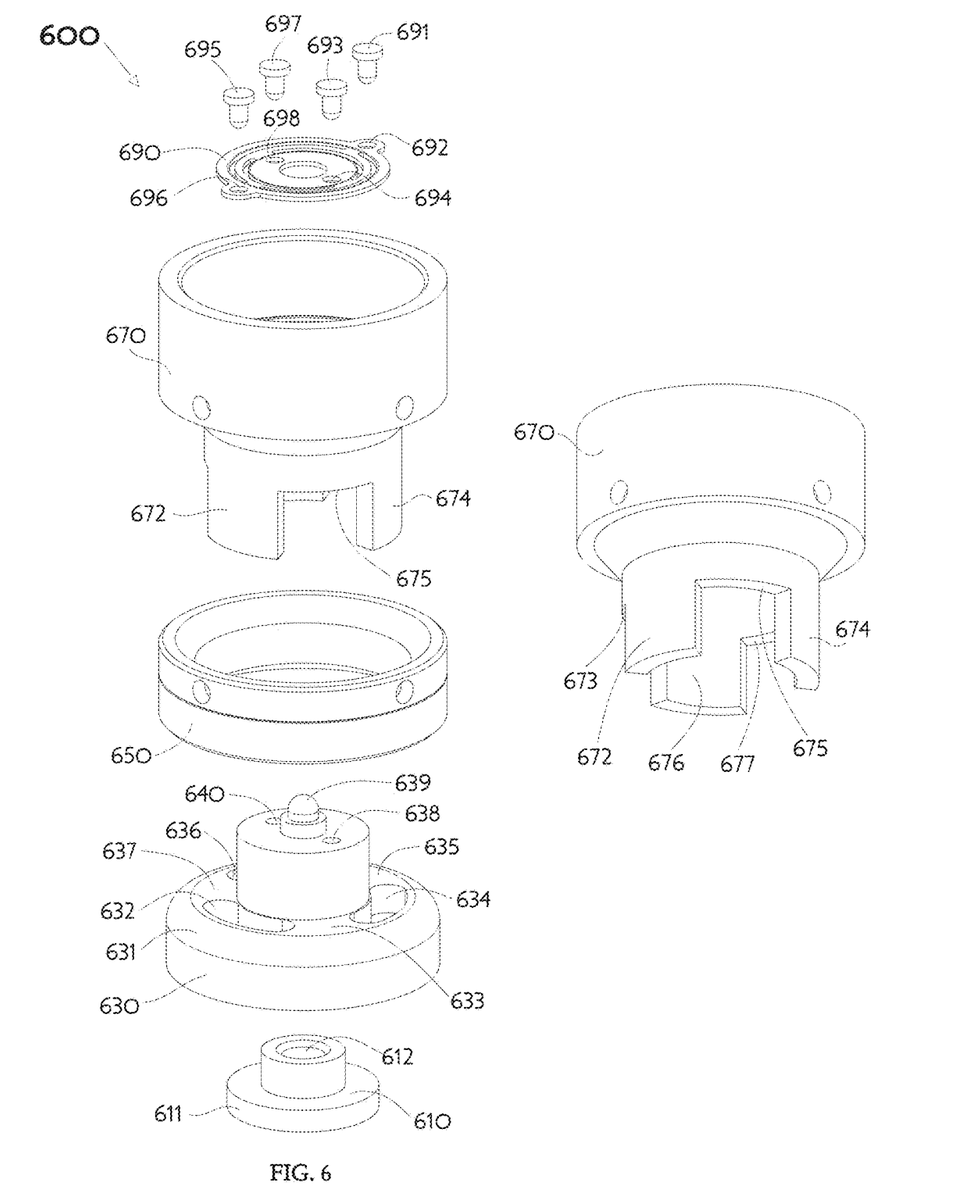
FIG. 6 is an exploded view of another embodiment of the circular linkage.

Another combination is illustrated in FIG. 6 showing an exploded view of a compact circular linkage 600 having a hidden fork structure comprising three symmetrically placed axial members 672,674,676 which pass through three corresponding axial thru-slots 632,634,636 in the full diameter portion of a thrust plate 630. Corresponding reliefs 673,675, 677 between the hidden fork prongs 672,674,676 which straddle the radial bridges 633,635,637 between the thru-slots 632,634,636 are shown along with similar features like numbered as in FIG. 1. Similar to the topmost element of the compact circular linkage 100, the guide disc 690 provides axial alignment of the reduced diameter upper portion of the thrust plate 630 by centering it within the central bore of the lifting housing 670. The guide disc 690 also provides angular indexing between the lifting housing 670 and the thrust plate 630 to position the three prongs 672,674,676 of the hidden fork projecting through three arcuate thru-slots 632,634,636 so there is no rubbing nor other axial motion interference. The guide disc 690 is a part easily flexible in a general axial direction but relatively stiff in radial and circumferential angular location. The guide disc 690 may be conveniently attached to the lifting housing 670 and thrust plate 360 by interference fit rivets 691,693,695,697 pushed into suitable corresponding outer blind holes (not visible) of the lifting housing and inner blind holes 638,640 of the thrust plate. Other assembly methods such as welding or threaded fasteners may be considered, but the rivets 691, 693,695,697 benefit from relative ease of assembly. The guide disc 690 may be made by chemical etching of sheet metal stock, but it should also be appreciated all five elements 610,630,650,670,690 may also be manufactured of either metal or polymer materials by processes such as injection molding, die-casting, or additive manufacturing methods such as 3D printing. Designers will also appreciate welding of the lifting element 610 to the ends of the three hidden fork prongs 672,674,676 may be done along an edge 611 without need for a weld preparation type of recess shown in FIG. 1. Electron beam, laser, or similar welding processes are well suited to making this assembly.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A linkage assembly configured to operatively couple an expanding valve actuator and a movable element of a valve, the linkage assembly comprising:
   a thrust plate having a thrust plate body and including a plurality of thru-slots defined in the thrust plate body and that extend axially through the thrust plate body;
   a lifting housing to engage the expanding valve actuator, the lifting housing including a plurality of prongs depending from the lifting housing and extending through at least one of the plurality of thru-slots;
   a lifting element having a body secured to the plurality of prongs and securable to the movable element; and
   a guide disc attached to the thrust plate body and attached to the lifting housing to center an upper end of the thrust plate body within the lifting housing and to provide angular indexing between the plurality of prongs and the plurality of thru-slots.

2. The linkage assembly of claim 1, wherein the guide disc is attached to the thrust plate body by one of a first weld, at least one first threaded fastener, and at least one first rivet, and the guide disc is attached to the lifting housing by at least one of a second weld, at least one second threaded fastener, and at least one second rivet.

3. The linkage assembly of claim 1, wherein the guide disc is attached to the thrust plate body by at least one first rivet received in at least one first blind hole defined in the thrust plate body, and wherein the guide disc is attached to the lifting housing by at least one second rivet received in at least one second blind hole defined in the lifting housing.

4. A linkage assembly configured to operatively couple an expanding valve actuator and a movable element of a valve, the linkage assembly comprising:
   a thrust plate having a thrust plate body and including a plurality of thru-slots defined in the thrust plate body and that extend axially through the thrust plate body;
   a lifting housing to engage the expanding valve actuator, the lifting housing including a plurality of prongs depending from the lifting housing and extending through at least one of the plurality of thru-slots; and
   a lifting element having a body secured to the plurality of prongs and securable to the movable element,
   wherein the lifting housing is cylindrical, and the plurality of prongs includes at least two arcuate prongs that are symmetrically arranged on a lower end of the lifting housing, each arcuate prong of the at least two arcuate prongs being circumferentially spaced apart from another arcuate prong of the at least two arcuate prongs by a relief defined circumferentially therebetween.

5. The linkage assembly of claim 4, wherein the plurality of thru-slots includes at least two arcuate thru-slots that are symmetrically arranged in the thrust plate body, each arcuate thru-slot being separated from another arcuate thru-slot of the at least two arcuate thru-slots by a respective radial bridge of the thrust plate body.

6. The linkage assembly of claim 5, wherein the thrust plate includes a reduced diameter upper body portion connected to a full diameter lower body portion, the upper body portion being connected to the lower body portion by each radial bridge.

7. The linkage assembly of claim 6, wherein the thrust plate body includes a button centered on the upper body portion of the thrust plate body.

8. The linkage assembly of claim 7, wherein the body of the lifting element includes an internally threaded hole.

9. The linkage assembly of claim 8, further comprising a guide disc attached to the thrust plate body and attached to the lifting housing to center an upper end of the thrust plate body within the lifting housing and to provide angular indexing between the plurality of prongs and the plurality of thru-slots, the guide disc being attached to the thrust plate body by at least one first rivet received in at least one first blind hole defined in the thrust plate body, the guide disc being attached to the lifting housing by at least one second rivet received in at least one second blind hole defined in the lifting housing.

10. The linkage assembly of claim 9, wherein the body of the lifting element has a circular shape and has a circumferential step, each prong including a step relief at a lower end of the prong secured to the circumferential step of the lifting element.

11. The linkage assembly of claim 4, in combination with a valve housing of the valve, wherein the movable element is a control shaft of the valve, the control shaft being secured to a control plate body that is configured to sealingly engage an orifice ridge of the valve, and wherein the body of the lifting element includes an internally threaded hole that screws onto the control shaft.

12. The linkage assembly of claim 4, in combination with the expanding valve actuator and the moveable element of the valve, wherein the expanding valve actuator is one of a piezoelectric stack, a bellows, and a pneumatic piston.

13. The linkage assembly of claim 4, in combination with a valve housing of the valve, wherein the valve is a normally closed proportional modulating valve.

14. The linkage assembly of claim 4, wherein the plurality of prongs are permanently attached to the body of the lifting element by welding.

15. A linkage assembly configured to operatively couple an expanding valve actuator and a movable element of a valve, the linkage assembly comprising:
a thrust plate having a thrust plate body and including a plurality of thru-slots defined in the thrust plate body and that extend axially through the thrust plate body;
a lifting housing to engage the expanding valve actuator, the lifting housing including a plurality of prongs depending from the lifting housing and extending through at least one of the plurality of thru-slots; and
a lifting element having a body secured to the plurality of prongs and securable to the movable element; and
an externally threaded ring nut configured to secure the thrust plate to a valve housing of the valve.

16. The linkage assembly of claim 15, wherein the ring nut has a conical inner surface configured to contact a circumferential region of the thrust plate, the circumferential region having a shoulder radius.

17. The linkage assembly of claim 16, in combination with the valve housing of the valve, the valve housing including an internally threaded counterbore to receive the linkage assembly.

18. The linkage assembly of claim 17, further comprising a low hysteresis diaphragm formed within the valve housing; and
a control shaft secured to the low hysteresis diaphragm and a control plate body secured to a lower end of the control shaft.

19. The linkage assembly of claim 17, further comprising a boost spring seated in the counterbore beneath the linkage assembly, the boost spring providing one of an actuator preload or an extra shut-off force.

20. A linkage assembly configured to operatively couple an expanding valve actuator and a movable element of a valve, the linkage assembly comprising:
a thrust plate having a thrust plate body and including a plurality of thru-slots defined in the thrust plate body and that extend axially through the thrust plate body;
a lifting housing to engage the expanding valve actuator, the lifting housing including a plurality of prongs depending from the lifting housing and extending through at least one of the plurality of thru-slots; and
a lifting element having a body secured to the plurality of prongs and securable to the movable element,
wherein the body of the lifting element has a circular shape and has a circumferential step, each prong including a step relief at a lower end of the prong secured to the circumferential step of the lifting element.

21. A linkage assembly configured to operatively couple an expanding valve actuator and a movable element of a valve, the linkage assembly comprising:
a thrust plate having a thrust plate body and including three thru-slots defined in the thrust plate body and that extend axially through the thrust plate body;
a lifting housing to engage the expanding valve actuator, the lifting housing including three prongs each depending from the lifting housing and extending through a respective one of the three thru-slots;
a guide disc attached to the thrust plate body by two first rivets and attached to the lifting housing by two second rivets to center an upper end of the thrust plate body within the lifting housing and to provide angular indexing between the prongs and the thru-slots; and
a lifting element having a body secured to the three prongs and securable to the movable element.

* * * * *